W. A. CHERRY
CHAIN-PUMP.
No. 177,208.  Patented May 9, 1876.
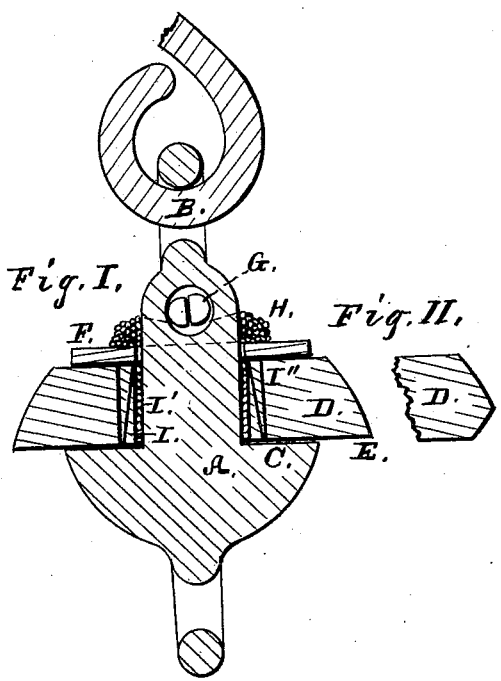
WITNESSES:
T. C. Smith
Harry Coleman
William A. Cherry, INVENTOR,
By Saml. J. Wallace,
Attorney,

UNITED STATES PATENT OFFICE.

WILLIAM A. CHERRY, OF WARSAW, ILLINOIS.

IMPROVEMENT IN CHAIN-PUMPS.

Specification forming part of Letters Patent No. 177,208, dated May 9, 1876; application filed September 6, 1875.

*To all whom it may concern:*

Be it known that I, WILLIAM ALBERT CHERRY, of Warsaw, Hancock county, Illinois, have invented a new and useful Improvement in Chain-Pumps, made substantially as set forth hereinafter, referring to the accompanying drawings, in which—

Figure 1 is a section of the improved parts. Fig. 2 is a modification of the bevel of the rubber.

This invention consists in making the buckets of chain-pumps with wearing parts of rubber, and arranging the parts so they cannot get out of good order, and so that the rubber portion can be readily expanded to fit the tube, as it wears, without separating the chain, in the manner shown.

The central part A is a metal casting, connected at its ends with the links of the chain B. This has a shoulder, C, around it, against which the rubber part D bears. The rubber D is a disk, with an outer edge, E, formed as shown in Fig. 1, beveled to a point at its lower edge all around, or, as in Fig. 2, beveled from both above and below to the center, so that it may be reversed several times as it wears, and is expanded. The washer F rests on top of the rubber D, and is held down on it by the spring cross-key G. When the rubber wears too small a new washer, F, is added to the old one below the key G. This compresses and expands the rubber. When the expansion is to be small the wire H is wound around the part A, between the key G and the washer F. This is done without taking the chain in two, and, being solid, holds secure and does not wear out. The ferrule-like washer I is inserted between the rubber D and part A by taking out the key G and drawing up the rubber D, and the washer F on part A is made with a length for the purpose. The washer I is made of copper or other flexible metal, with a slit on one side, so it can be opened to put on part A without taking the chain in two. This expands the rubber. It has the upper edge thin, so the rubber will readily pass down onto it and be expanded at its lower side. One or more additional washers I are added from time to time as the rubber gets too small. The wire I' is wound on part A, and the washer I put on it, to enable the rubber to slip down onto it; or a thread might be used instead of the wire, but is not so permanent. These several means of expansion are used as required and as preferred; and it is all done without taking the chain loose or apart, except to put on new rubbers and washers D F; and all the parts remain permanently as put on so long as used, except the wear on the rubber.

I claim—

1. In a chain-pump, the combination, with the rubber bucket D and washer F, of the central part A, having shoulder C and the pin G separate from the link of chain, all arranged so the bucket D may be moved on part A, for inserting means for expansion by removing pin G, and without taking the chain in two, substantially as set forth.

2. The combination, in a chain-pump, of the rubber D and the central part A with the separate annular expansion-wedge, substantially as set forth.

WILLIAM ALBERT CHERRY.

Witnesses:
SAML. J. WALLACE,
WM. J. COCHRAN.